United States Patent
Bradley et al.

[11] Patent Number: 5,219,470
[45] Date of Patent: Jun. 15, 1993

[54] APPARATUS AND METHOD FOR CLARIFIER SLUDGE COLLECTION

[75] Inventors: Bruce D. Bradley, Salt Lake City; Steven G. Coombs, Layton, both of Utah

[73] Assignee: Baker Hughes Incorporated, Houston, Tex.

[21] Appl. No.: 758,912

[22] Filed: Sep. 10, 1991

[51] Int. Cl.$^5$ .................. B01D 37/00; B01D 12/00
[52] U.S. Cl. ..................... 210/767; 210/520; 210/528; 210/525
[58] Field of Search ............. 210/767, 513, 519, 520, 210/525, 808, 803, 195.3, 528, 603, 521, 528, 532.1, 87

[56] References Cited

U.S. PATENT DOCUMENTS

| | | | |
|---|---|---|---|
| 3,025,966 | 3/1962 | Kivell | 210/520 |
| 3,314,547 | 4/1967 | Kivell | 210/520 |
| 3,486,628 | 12/1969 | Darby | 210/520 |
| 3,487,017 | 12/1969 | Thorn et al. | 210/520 |
| 3,770,131 | 11/1973 | Davis et al. | 210/519 |
| 3,926,805 | 12/1975 | Walker | 210/519 |
| 4,193,877 | 3/1980 | Lillywhite | 210/520 |
| 4,271,027 | 6/1981 | Kelly | 210/609 |
| 4,302,328 | 11/1981 | Van Note | 210/800 |

OTHER PUBLICATIONS

Mark J. Hammer, Water and Waste Water Technology, Second Edition, (1986) pp. 442-443.
Publication Bulletin No. 315-121—cover page p. 9 and last page ©1981, 1984 REX/ENVIREX.

*Primary Examiner*—Robert A. Dawson
*Assistant Examiner*—Ana M. Fortuna
*Attorney, Agent, or Firm*—Skjerven, Morrill, MacPherson, Franklin, & Friel

[57] ABSTRACT

A sludge removal apparatus for a clarifier tank includes a rotatable or stationary sealed sludge collection box submerged in the tank and surrounding a vertical, central influent column. The collection box is positioned at any elevation between the tank bottom to a position just below the liquid/solids level in the tank. A rotatable rake arm or pick-up pipe or sludge collection duct may be affixed to and rotates with the box and a driving cage to push or pick-up sludge at the tank bottom for transport to the collection box. A substantially constant flow of sludge may be provided in the collection box by valved or adjustable orifice control over the flow of sludge from the pick-up pipe(s) or duct(s) or center tank cone. A fixed flanged manifold spool with spaced branches is positioned between flanged vertical sections of the center column and sludge is transported from the collection box through the branches to a concentric sludge withdrawal pipe extending downwardly within the center column.

27 Claims, 7 Drawing Sheets

APPARATUS AND METHOD FOR CLARIFIER SLUDGE COLLECTION

FIELD OF THE INVENTION

This invention is directed to apparatus and a method of removing hydraulic sludge from a clarifier or thickener. More particularly the invention concerns a system and method of collecting sludge from adjacent the bottom of a clarifier tank and where a continuous or intermittent flow of collected sludge is transported to a sump or a suction end of a slurry pump.

BACKGROUND OF THE INVENTION

A so-called Sight Well type sludge collection system as seen in prior art and references cited in U.S. Pat. No. 4,193,877 includes an open-top rotatable box generally cylindrical or rectangular in shape which is partially submerged in the tank liquid/solids and surrounds an upper portion of an influent column. The sight well has suction pipes depending therefrom which connect to radial rake arms rotatable to sweep around the tank bottom. A controlled flow of settled sludge is transported by a hydraulic differential force into the open well from whence the sludge moves through inlet ports in the influent column to fall down a sludge pipe, concentrically mounted inside the influent column, to a sump. The sludge normally then is pumped from the sump. While many of these devices have been successfully operated, a problem has existed that at low sludge flows inclusions of air can be sucked into the column sludge inlet ports and into the down pipe which can cause cavitation in the pump or uneven flow into the sump. Also, the open top nature of the sludge sight well allows wind-blown debris or items dropped from the clarifier bridge to foul or obstruct the conduit to the sump or pump suction.

Another prior art construction is termed a Duct-Manifold type collector in which a perforated duct is in communication with a rotating bottomless drum at the center tank bottom, with a sludge withdrawal opening in the concrete tank floor below the drum leading directly into a sludge sump or pump suction. A limitation of this device has been that the duct orifices, which are located at intervals along the arm, and of varying diameters to provide uniform clarifier bottom sludge pickup, are usually of small enough size that settled trash and debris are sucked into the smaller orifices, plugging them and upsetting balanced flow.

Another prior art device known as a Top-Feed type collector as seen in U.S. Pat. No. 4,193,877 includes an open-top collection box forming an influent energy dispersion trough and baffles adjacent to influent windows in an influent column at the liquid/solids level in the tank. The sludge/liquid level in the box is adjustable. Settled sludge is transported upward through draw-off pipes into the box and into an inner concentric pipe in the influent column. Again since the box has an open top, air and trash inclusions can be present in the pumped sludge discharge and pump cavitation or clogging can result.

In both cases of concentric internal sludge discharge pipes, an additional consideration comes into play when the steel parts of the clarifier wear out, and the owner considers replacement with either an identical model, or a newer concept unit. Duplicating the original unit is possible without modifying the tank bottom. However if a Duct Manifold type unit is now wanted, the thick concrete center floor area must be excavated and modified to suit. The present invention makes possible the changeover from an "open top sight well" type clarifier to a "duct manifold" type clarifier, without requiring excavation of existing concrete tank bottom.

Another prior art device offered by several manufacturers is termed the Duct-Sightwell type collector in which a perforated duct near floor level is in communication with an open top sightwell. That sightwell carries the drawback of the open top designs already mentioned.

SUMMARY OF THE INVENTION

The present invention includes a sealed, completely submerged sludge collection box or drum sealed and normally rotating against the stationary center support column. "Sealed" as used herein means a construction where entry of fluids or air or trash, or any material or object, other than settled sludge and its elements drawn from the tank floor, is generally prevented. In clarifiers where the center column also serves as influent column, the present invention allows influent ports to be located at or near the clarifier water surface elevation to create surface movement which will serve to move scum toward feedwell scum ports. The sludge collection box may be located below the influent ports, and differs from the "top feed" design in that the sludge box is submerged and sealed. Air sucking and potential pump damage due to cavitation and/or trash accumulation are thus prevented. Submergence of the box is also an improvement over the sight well design because it assures a constant level of suction head available for sludge discharge pumping equipment.

The elevation of the collection box, closer to the surface as in several of the embodiments, is also an improvement over the duct/manifold design in that sludge box seals can be inspected with brief partial tank draining (versus a total draining of the clarifier to inspect duct/manifold seals). A perforated sludge duct or a number of individual sludge collection pipes can be placed in communication with the sludge box. Optional flow control devices, inside the submerged sludge box, regulate relative sludge flows through the sludge collection pipes. Optional flow control device control rods at the clarifier surface can be adjusted from the clarifier operating platform. Customers can be advised of suggested flow device settings for various flow rate ranges based on empirical testing and/or calculations.

The inside top and bottom of the rotating sludge collection box seals against the stationary vertical clarifier center support column. Sandwiched between upper and lower portions of the center column, located at the same elevation as, and in communication with the rotating sludge box, is a stationary sludge-receiving manifold which in turn communicates with a sludge withdrawal pipe which is concentric inside the center column. The sludge withdrawal pipe exits the bottom center of the clarifier and discharges to an open sump or is connected to a pump outside of the clarifier. The sandwiched stationary sludge- receiving manifold, more particularly the wall cylinder and flanges of a spool piece containing the manifold, is designed to support the upper segment of the center column and all dead and live loads imposed from the clarifier mechanism, drive, platform, and walkway. The sludge receiving apparatus can be located at any elevation ranging from the tank bottom to just below the water surface.

DETAILED DESCRIPTION

Figure 1:
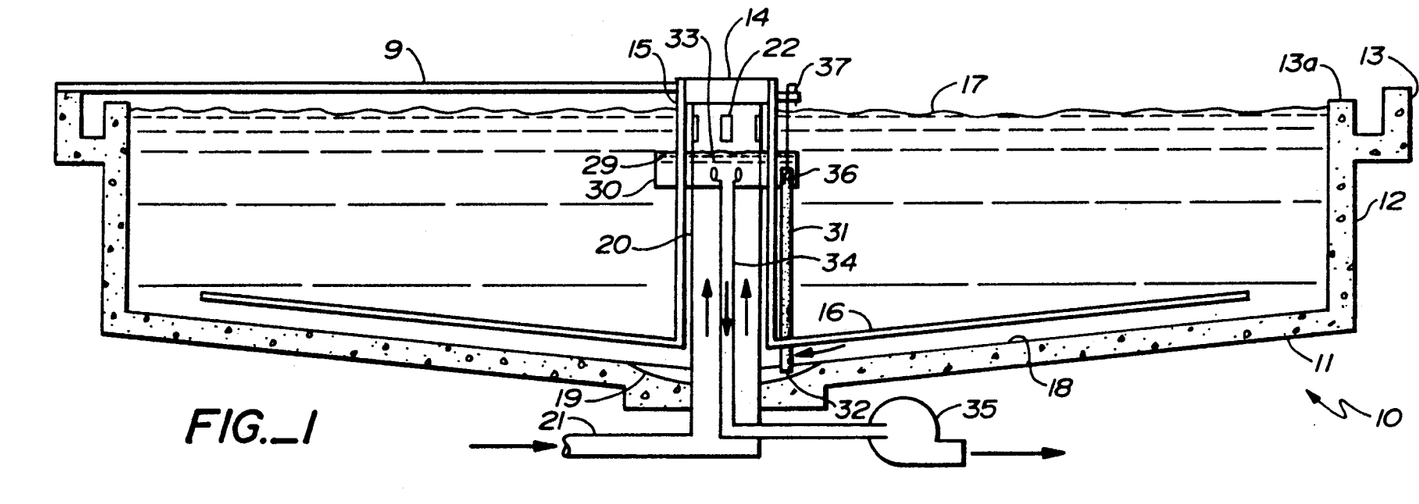
FIG. 1 is a partial cross-sectional view of a wastewater clarifier with the sludge collection mechanism of the invention positioned around a central axis thereof.

FIG. 1 shows the overall apparatus 10 for sludge collection which employs a conventional clarifier tank 12 having a cylindrical sidewall and a normally inclined tank bottom 11 of concrete or metal construction. A peripheral, or segmented or radial overflow trough or launder 13 is provided to collect clarified liquid which flows from the interior of tank 12 over a weir 13a. In normal clarifier operation the liquid-solids level 17 is adjacent the top of weir 13a. A stationary access bridge structure 9 extends from the tank periphery to a center drive base 14 at the tank center on which is mounted a conventional drive unit including a motor and gears (not shown) coupled to and rotatively driving a depending cage 15. The cage is comprised of vertical and angularly disposed cross structural members connected to the drive unit and extending to a position just above the floor 18 of the tank. One or more sludge collection arms 16 connected to a lower part of the cage 15 extend radially or spirally from the cage generally parallel to the floor of the tank. Scraper blades (not shown) as known in the art may generally extend from the bottom of each rake arm and urge settled sludge toward the tank center as the rake arms sweep over the bottom tank floor 18. The sludge is collected preferably in a sludge pocket or drain sump 19 over which extend the open end 32 of a suction pipe 31 for removal of the settled and raked sludge.

A center influent/support column 20 is provided, bolted to the concrete floor, surrounded by the drive cage, extending above the level of the weir 13a. A feed inlet pipe 21 transports liquid-solids feed, for example, wastewater previously subjected to a biological treatment process, into the bottom of the column 20. Exit ports 22 distribute the influent feed into the tank just below the liquid level 17. A top flange 20a of the influent center column serves as a mounting surface for the drive housing, which in turn supports the weight of the bridge and platform.

A closed sludge collection box 30 surrounds the center column 20 and is fixedly attached to cage 15 so the box rotates with the cage 15 and rotates the sludge suction pipe 31 depending from the box. The settled sludge suction is transported up the sludge pipe 31, through a sludge flow control valve 36 at the upper end of pipe 31. The sludge fills collection box 30 so that the upper level 29 of the sludge abuts the inside top of the box. This valve is controllable by a valve operator or handle 37 adjacent the bridge 9 and drive base 14. The flow rate of sludge into the manifold assembly 33 within the box 30 is thus controlled. A fixed sludge withdrawal pipe 34 extends downwardly and concentrically within column 20 to a sludge pump 35. The net positive suction head provided from the clarifier water surface elevation also provides a driving force along with the pump suction. In an alternative configuration, the sludge withdrawal pipe 34 may pass radially outward under the tank from the tank center by line 8 to an exterior sump 9 at the tank periphery, with the pump 35 intake extending vertically into the sump to a position adjacent the sump bottom to withdraw sludge from the sump.

Figure 2:
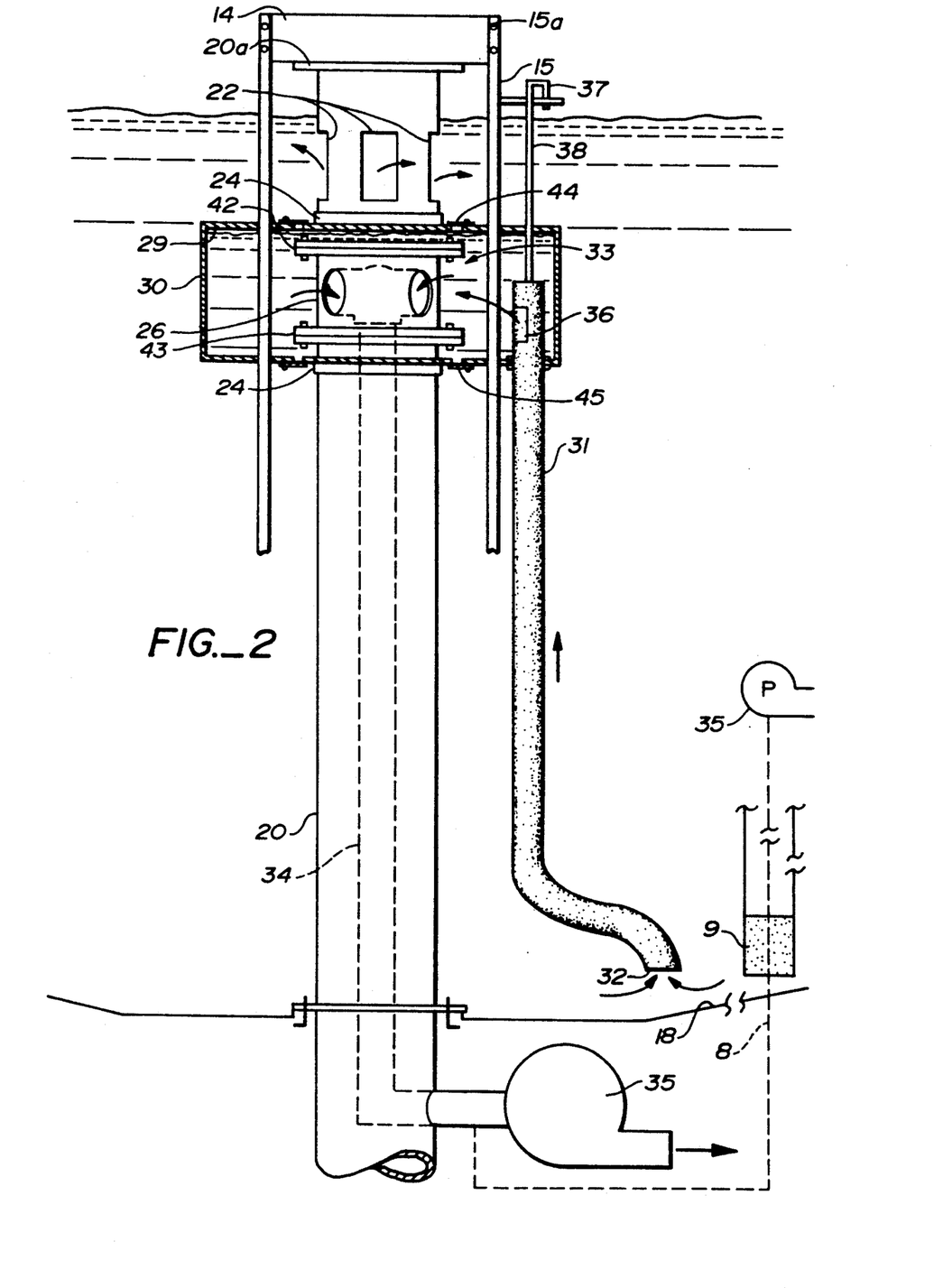
FIG. 2 is a partial elevational schematic view of the collection mechanism positioned at the influent column top with the submerged collection box in cross-section to show the mechanism internals.

FIG. 2 shows the general mechanical connection of cage 15 to a rotating main gear (not shown) by bolts 15a, the gear being driven with respect to the fixed drive base 14. The manifold assembly 33 comprises a fixed spool piece 26 having an upper flange 42 and lower flange 43. The flanges are bolted onto corresponding flanges of sections of the center column 20. Rotational seals 44, 45, constructed of an elastomer such as neoprene available commercially are also seen, which allow for an effective seal of the sludge collection box with respect to collars 24 fixed on the center column. Various configurations of the suction pipe 31 may be employed to most efficiently pick up the settled sludge. In a preferred embodiment, 0 the pipe or duct entrance 32 is positioned about 6 to 10 cm above the tank floor 18.

Figure 3:
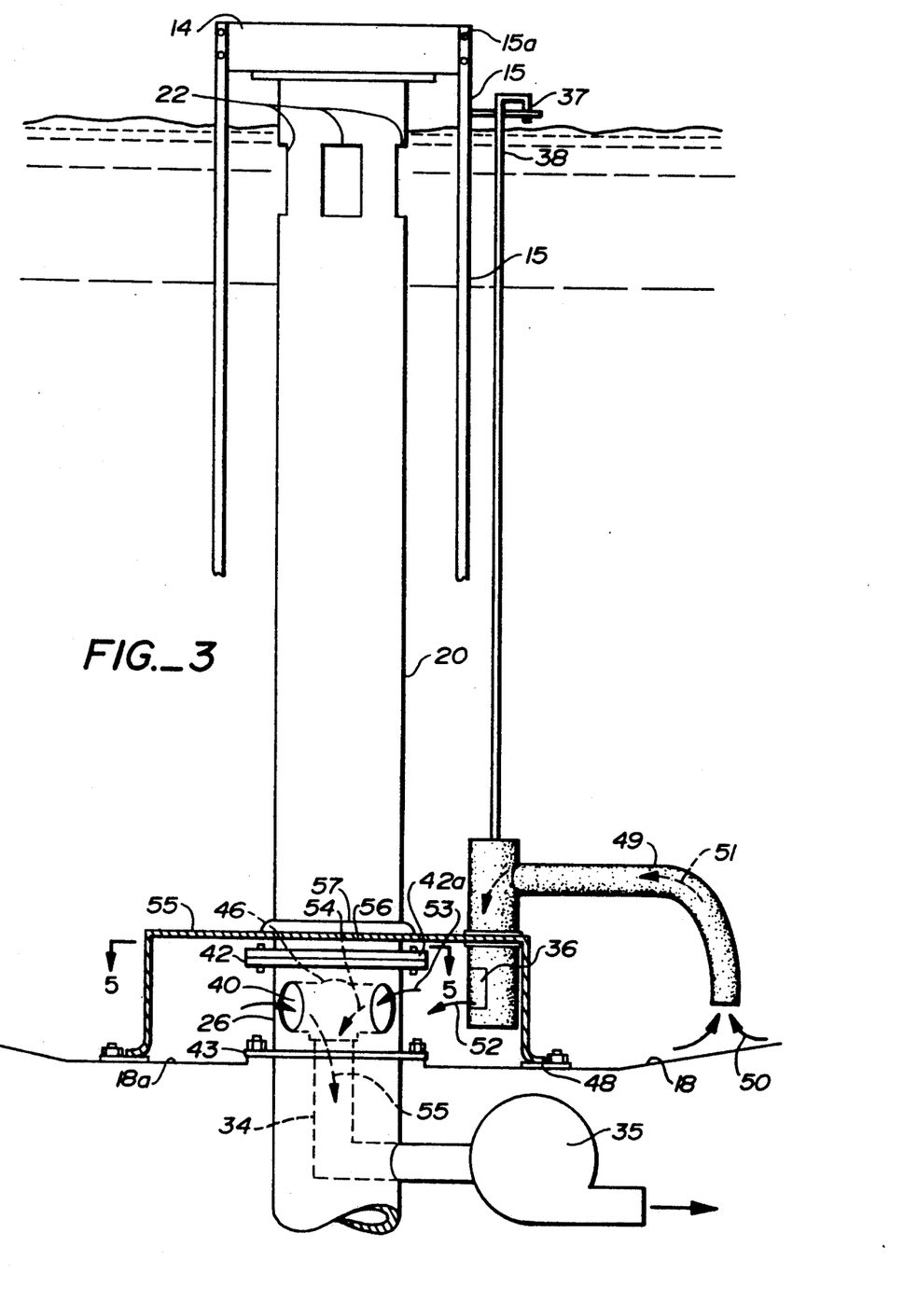
FIG. 3 is a partial elevational schematic view of a second embodiment of the collection mechanism located at the tank bottom.

FIG. 3 illustrates a second embodiment of the invention in which spool piece 26 is mounted by its bottom flange 43 directly to bolts 46 embedded into the tank bottom forming a common bottom wall with a central portion 18a of the tank bottom. Sludge collection box 55 is rotationally sealed to a fixed seal plate or angle 48, also bolted to or embedded in the tank bottom.

The upper flange 42 is mounted to a column flange 42a. A central circular top aperture 56 in the collection box is rotatively sealed by a circular elastomeric seal such as neoprene to a collar 57 fixed to center column 20.

Locating the sludge collection box at the bottom of the tank, under the center column, eliminates friction losses and other head losses which would occur with the box higher up the column. Additionally, with the box located in the tank zone where sludge concentration is greatest, the box, with proper baffling, can be used to suck in sludge directly without intermediate conduits, ducts, or pipes particularly as seen in the FIG. 8 and FIG. 9 embodiments.

A short curved or elbowed suction pipe 49 extends into the top of box 55 and conveys settled sludge from the tank floor (arrow 50) through pipe 49 (arrow 51) and then outwardly (arrow 52) into the box, as flow controlled by valve 36, valve operator 37 and valve adjustment rod 38. The sludge then flows (arrow 53) from a sludge-containing annulus in the box into the entrance 40 of the manifold and into sludge withdrawal pipe 34 (arrow 55) and into the suction end of pump 35 for discharge.

Alternatively, suction pipe 49 can be functionally replaced by up to a multitude of suction pipes. In some cases, these would penetrate the side of the box. In most cases these would rotate at the same speed as the box.

Figure 4:
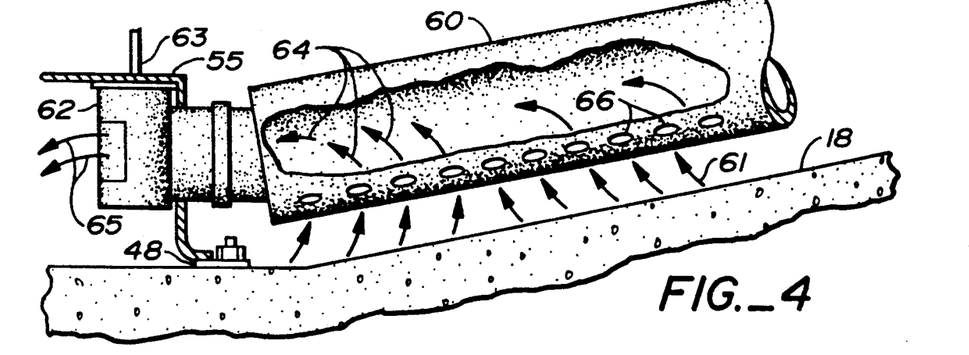
FIG. 4 is a partial elevational schematic view of a third embodiment of the collection mechanism employing a radial, perforated sludge collection duct.

FIG. 4 illustrates a further embodiment of the invention in which the suction pipe is a separate, rotatable perforated sludge duct or part of the inner end of the sludge collecting arm. The arm or perforated sludge duct rotates with sludge collection box 55 and in so doing, sucks up settled sludge through apertures 66 from tank floor 18 as shown by the arrows 61 through the arm 60 (arrows 64) and into the interior of box 55 (arrows 65), as flow controlled by valve 62 operated from above the tank by adjustment rod 63.

Figure 5:
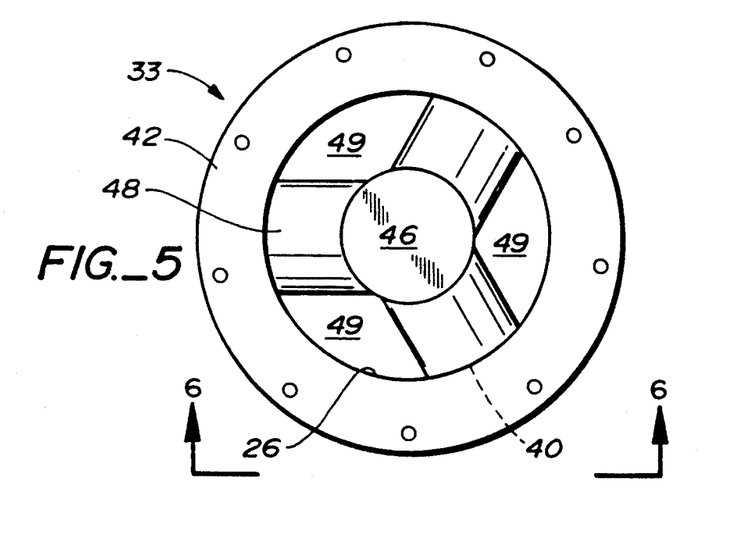
FIG. 5 is a plan view of the manifold spool of the collection mechanism taken on the line 5—5 of FIG. 3.
Figure 6:
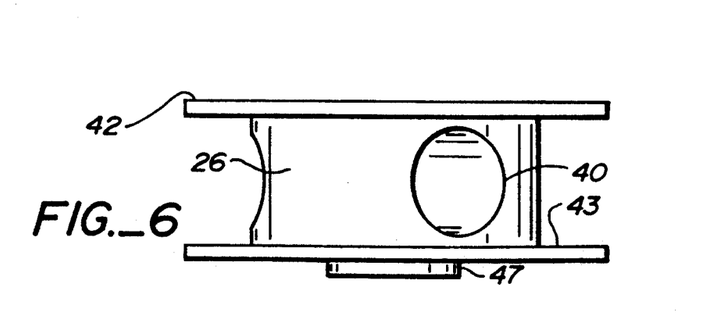
FIG. 6 is a side elevational view taken on the line 6—6 of FIG. 5.

FIG. 5 shows a top view of the manifold assembly 33, including a sludge withdrawal pipe top central cap closure 46 and three 120° spaced fixed branches 48 having entrances 40 leading from the sludge collection box (FIG. 3) to the fixed withdrawal pipe. Spaces 49 between the branches allow flow of influent up through the center column. As seen in FIG. 6 a cylindrical stub 47 extends downward from the confluence of the branches 48 for connection to the sludge withdrawal pipe (FIG. 2), normally by a neoprene-lined flexible connector such as a Victaulic or Dresser type, or "no hub" coupling. The flanges 42, 43 as well as the cylindrical wall of the spool piece 26 are designed for supporting the dead and dynamic loads occasioned by the walkway, platform, drive base, drive mechanism and gears mounted on and above the center column.

Flow control device settings for various sludge flow rates may be made based on empirical testing or by calculations. The sludge flow control device 36 is a rotary slip tube valve manufactured by and available from Eimco of Salt Lake City, Utah and designated as a rotary sludge flow control valve.

Figure 7:
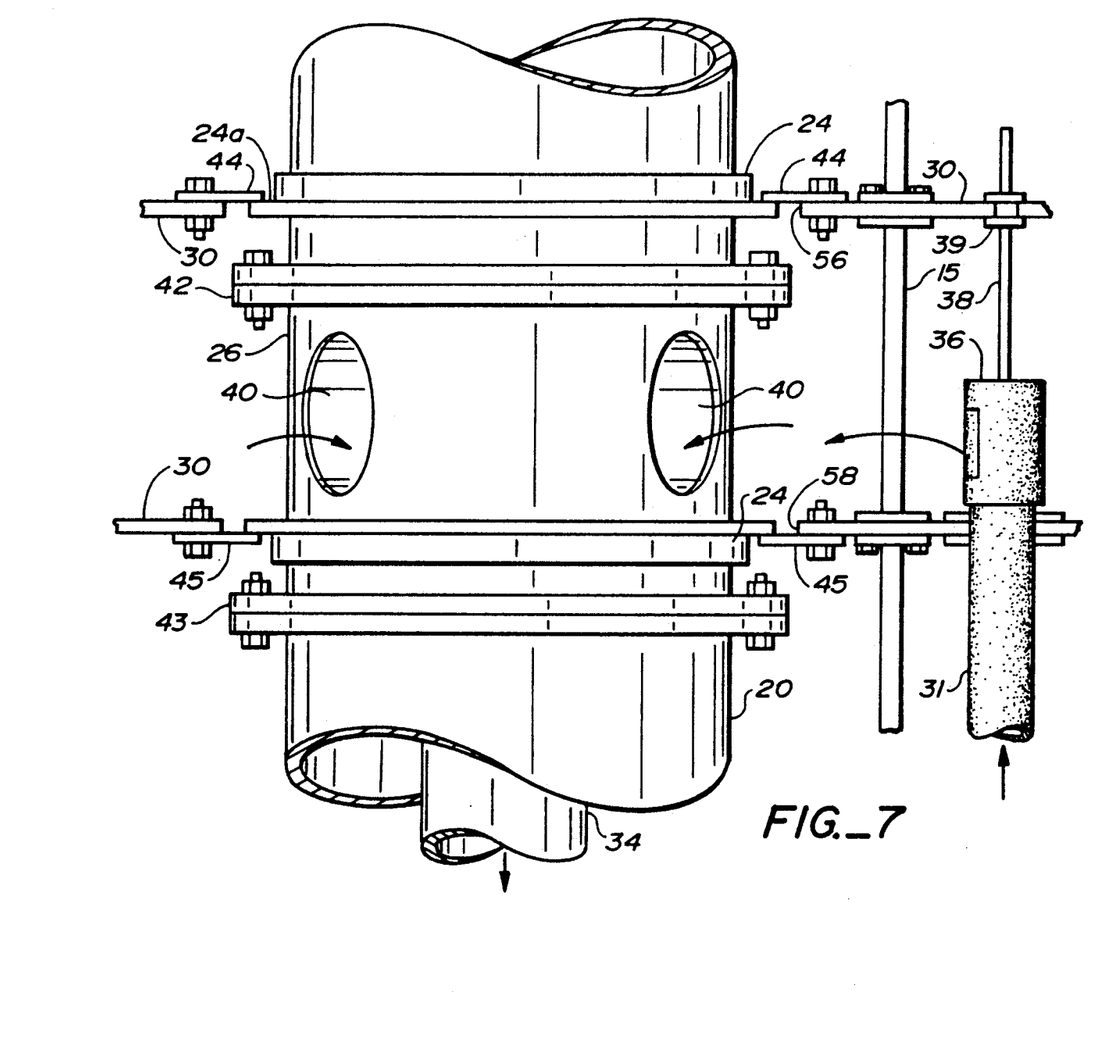
FIG. 7 is a detailed side view of the connection of the manifold spool to the influent column and the rotating seals of the collector box.

FIG. 7 illustrates in more detail the circular rotational seals 44, 45 mounted to the edges of aligned central apertures 56, 58 in the sludge collection box 30 and in rotational sliding contact with a flat flange 24a on fixed collars 24 attached to the center column 20. While the spool piece 26 has been shown alternatively positioned at the top and bottom of the center column, it may be positioned intermediate of the column top and bottom. Rod 38 traverses a top wall of box 30 through a grommet 39 of elastomer material such as neoprene available commercially.

Figure 8:
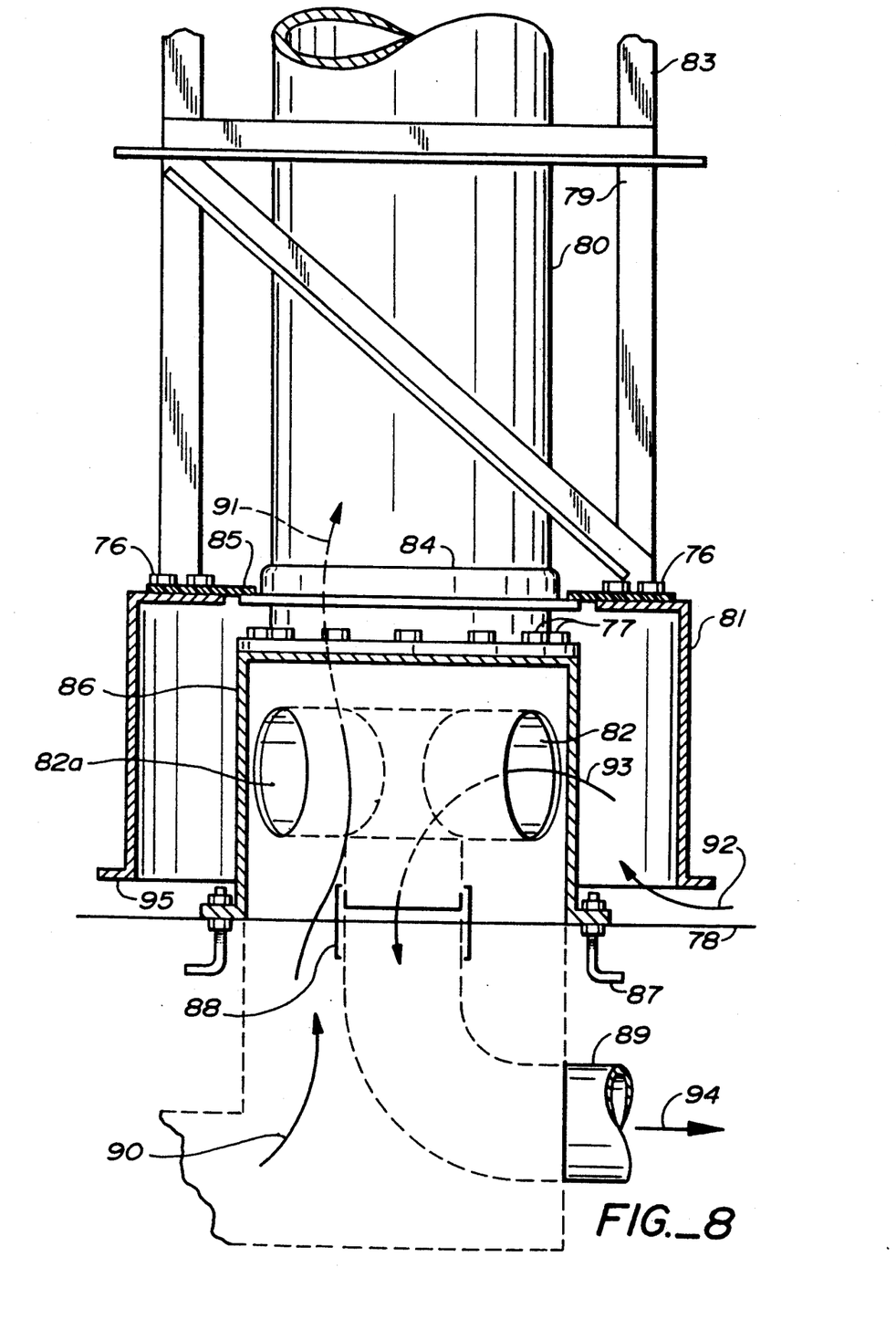
FIG. 8 is partial side elevational and cross-sectional view of a further embodiment of the invention.
Figure 9:
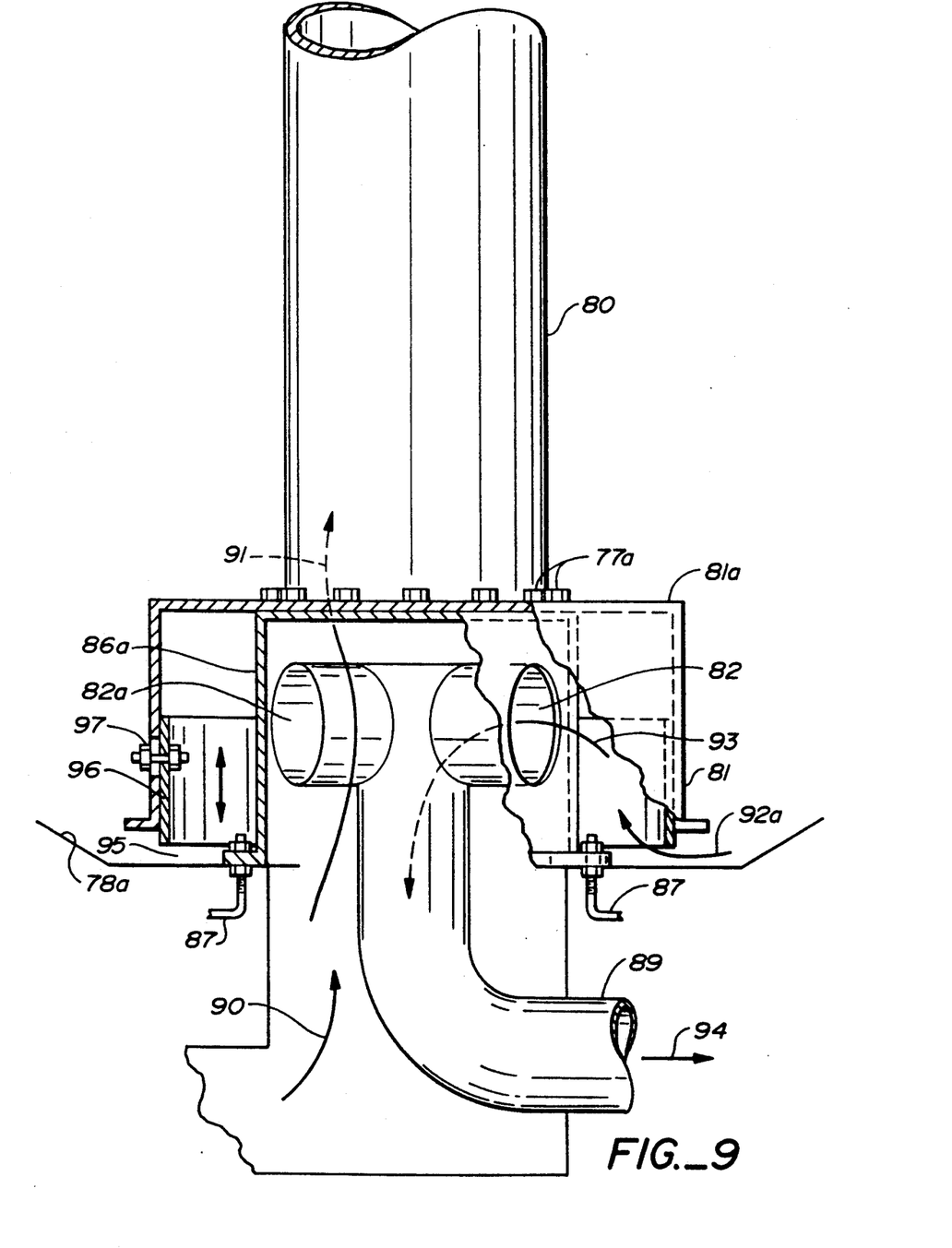
FIG. 9 is a partial side elevational schematic view of a further embodiment of the invention.

FIG. 8 shows a further embodiment of the invention in which a fixed center influent column 80 of a diameter smaller than the diameter of the sludge manifold 86 is fixed to one inward top flange of the manifold by bolts 77. A rotatable cage 83 having vertical and cross truss members 79 extends around the influent column. Rake type collector arms (not shown) may extend from a rotating cage so as to move settled sludge toward the center of tank floor 78. The sludge collection box 81 in this embodiment may be connected by bolts 76 to the cage 83 and rotate therewith or be fixed to the exterior of the influent column 80 adjacent collar 84. The latter construction is seen in FIG. 9. If fixed to and movable with the cage, an elastomeric neoprene seal 85 seals the collection box against a rolled seal angle forming collar 84. The sludge collection manifold 86 is affixed to the tank floor 78 by anchor bolts 87. Floor 78 may be flat or have a positive or negative cone slope. Sludge which settles on floor 78 is pulled in as indicated by arrow 92 to the collection box 81 through a continuous floor-level orifice or annulus 95. The sludge then flows (arrow 93) through entry ports 82a in an inner manifold assembly 82 and into sludge withdrawal pipe 89 as indicated by arrow 94 to a collection sump and/or to a pump. The manifold assembly 82 is stub-connected by a coupling 88 to the withdrawal pipe 89. Incoming wastewater feed enters the influent column at its bottom as illustrated by arrow 90. The feed passes around the exterior of the manifold assembly 82 and up the column (arrow 91) for entry into the overall tank as shown in FIG. 2.

The flanged manifold assembly 82 may be retrofitted to a standard sightwell-type clarifier by removing the old internals from the tank, leaving a center hole in the concrete tank bottom with a sludge withdrawal pipe extending as a stub upwardly therefrom and the center hole surrounded by the old anchors in the concrete floor. Alternatively, new anchors may be used. The new sludge collection manifold assembly 82 is set over the old anchor bolts and coupled to the withdrawal pipe stub and the other parts of the construction erected therearound.

FIG. 9 shows a further embodiment of the invention in which the collector box 81 is attached nonrotatably to the center column 80 by bolts 77a. Tank bottom slope 78a may be designed at a steeper pitch near the center, to assist movement of sludge toward the stationary collection box 81 and manifold 86a. Rakes attached to the rotating cage (not shown in FIG. 9) may also be used to facilitate sludge movement to the collection box zone.

The sludge receiving orifice 95 of the sealed collection box in this embodiment is the gap between the lower edge of the outer cylinder, and the most proximate ring on the concrete tank floor which floor serves as an integral part of the sealed collection box in this embodiment.

Although normally entirely controlled by external sump level or pumping rate, some local influence over flow, and thus adjustability, may be obtained by equipping the collection box outer or inner cylinder lower edge with a cylindrical ring extension 96 attached with bolts 97 in slotted connections which allow the clarifier or thickener operator to change the vertical height of the collection box annular orifice 95 by moving the ring extension 96 to desired up and down positions, and thus exert an additional control point (at sludge inlet arrow 92a) over the process of sludge collection and withdrawal.

The above description of embodiments of this invention is intended to be illustrative and not limiting. Other embodiments of this invention will be obvious to those skilled in the art in view of the above disclosure.

We claim:

1. A sludge removal apparatus for a clarifier/thickener comprising:
   a clarifier/thickener tank having a sludge-receiving tank bottom;
   an influent column extending upwardly from said tank bottom and having influent exit ports for discharging influent into said tank;
   a sealed closed-top sludge collection box submerged in said tank, said collection box surrounding said influent column and being positioned between said tank bottom and said influent exit ports;
   means extending from a position adjacent said tank bottom to said collection box for transporting settled sludge adjacent said tank bottom to said collection box such that in operation said transported settled sludge fills said collection box and the upper level of the transported settled sludge abuts the inside of the closed-top of the collection box;

a sludge withdrawal pipe within said influent column; and means constructed and arranged in flow connection between an interior of said collection box and said withdrawal pipe for removing sludge from said collection box to said withdrawal pipe.

2. The apparatus of claim 1 further including means for maintaining a substantially constant level of suction head of sludge in said collection box and available for sludge discharge pumping from said withdrawal pipe.

3. The apparatus of claim 1 further comprising flow control means constructed and arranged for controlling the flow of transported settled sludge to said collection box.

4. The apparatus of claim 3 wherein said flow control means comprises a rotary gate valve openable to said collection box and adjustable from a position above a liquid/solids level in said tank.

5. The apparatus of claim 1 wherein said means for removing sludge comprises a sludge manifold, said withdrawal pipe being constructed and arranged concentrically within said influent column; and wherein said influent column, said withdrawal pipe, and said sludge manifold are fixed together in a stationary position and said collection box rotates in said tank.

6. The apparatus of claim 5 wherein said sludge manifold comprises a series of integral spaced connection branches extending orthogonally to said withdrawal pipe and including a central cap closing off an upper end of said withdrawal pipe.

7. The apparatus of claim 6 wherein said connection branches extend radially with respect to said withdrawal pipe and said influent column, and constructed and arranged to permit influent flow therepast to said exit ports.

8. The apparatus of claim 1 further comprising pump means having a suction end attached to said withdrawal pipe for pumping settled sludge from said tank bottom to said collection box, through said means for removing and through said withdrawal pipe.

9. The apparatus of claim 1 wherein said collection box is positioned substantially immediately below and relatively close to a normal liquid-solids level in said tank.

10. The apparatus of claim 9 in which said means for transporting is constructed and arranged to have one sludge entry end juxtaposed to said tank bottom and a sludge exit end extending upwardly to the collection box positioned immediately below said influent exit ports.

11. The apparatus of claim 1 wherein said collection box is positioned substantially adjacent to said tank bottom, a portion of said tank bottom forming a common bottom wall of said collection box.

12. The apparatus of claim 11 further comprising a cylindrical extension movably connected to said collection box such that the vertical height of an annular orifice between said collection box and said tank bottom is adjustable.

13. The apparatus of claim 1 in which said collection box is constructed and arranged to form a sludge-containing annulus around a portion of said influent column and surrounding said means for removing sludge from said collection box.

14. The apparatus of claim 1 wherein said means for removing sludge comprises a sludge manifold in said influent column including a spool piece having upper and lower load-carrying flanges connected in line with said influent column and wherein said collection box surrounds said spool piece and said sludge manifold, said sludge manifold extending between said spool upper and lower flanges.

15. A sludge removal apparatus for a clarifier/thickener comprising:

a clarifier/thickener tank having a sludge-receiving tank bottom;

a central vertical influent column extending upwardly from said tank bottom and having influent exit ports at an upper column portion for discharging influent into said tank;

a means for raking settled sludge from said tank bottom toward a tank bottom central collection area;

a spool piece including an internal sludge manifold mounted in-line with said influent column, said spool piece having upper and lower load-carrying flanges, at least one of said flanges being connected to an end flange of a lower portion of said influent column;

a sludge withdrawal pipe positioned substantially concentrically within said influent column; and wherein said internal sludge manifold is constructed and arranged in flow connection between said tank bottom central collection area and said withdrawal pipe for removing sludge from said tank bottom central collection area to said withdrawal pipe.

16. The apparatus of claim 15 wherein said sludge manifold comprises a series of radial branches extending from a cylindrical periphery of said spool piece to said withdrawal pipe, said branches being spaced to allow flow of tank influent therepast.

17. The apparatus of claim 15 wherein the lower flange of said spool piece is mounted to anchor bolts in said tank bottom.

18. The apparatus of claim 15 further comprising a suction pump connected to said withdrawal pipe for sucking sludge collected in said central collection area into said manifold and into said withdrawal pipe.

19. The apparatus of claim 18 further comprising a sump adjacent to said tank in flow connection with said withdrawal pipe for removing settled and collected sludge from said sump.

20. The apparatus of claim 15 in which said means for raking includes a rotary cage surrounding said influent column and at least one rake arm attached to said cage and further comprising a sludge collection box surrounding said sludge manifold for transferring collected sludge from said collection area to said sludge manifold.

21. The apparatus of claim 20 in which said sludge collection box includes a closed-top and wherein said sludge collection box in operation is filled with transported settled sludge.

22. A method of collecting settled sludge in a liquid/solids clarifier/thickener having a tank, formed with a tank bottom, tank sides, and a vertical influent column extending upwardly from a central portion of the tank bottom, comprising:

(a) collecting settled sludge from the tank bottom by suction;

(b) flowing the collected sludge to a sealed closed-top collection chamber surrounding a portion of the influent column to fill said collection chamber, said collection chamber being submerged below a top level of liquid/solids in the tank;

(c) controlling the flow of collected sludge to the collection chamber;

(d) transporting the collected sludge from the collection chamber to a withdrawal pipe in said influent column; and (e) pumping collected sludge from said withdrawal pipe, said pumping step providing a suction force for step (a).

23. The method of claim 22 further comprising maintaining a constant level of suction head available in the collection chamber for the sludge pumping step.

24. A sludge removal apparatus for a clarifier/thickener comprising:

a clarifier/thickener tank having a sludge-receiving tank bottom;

an influent column extending upwardly from said tank bottom and having influent exit ports for discharging influent into said tank;

a sealed collection box submerged in said tank, said collection box surrounding said influent column and being positioned between said tank bottom and said influent exit ports;

means extending from a position adjacent said tank bottom to said collection box for transporting settled sludge adjacent said tank bottom to said collection box;

a sludge withdrawal pipe within said influent column;

means constructed and arranged in flow connection between an interior of said collection box and said withdrawal pipe for removing sludge from said collection box to said withdrawal pipe;

wherein said means for removing sludge comprises a sludge manifold, said withdrawal pipe being constructed and arranged concentrically within said influent column;

wherein said influent column, said withdrawal pipe, said sludge manifold are fixed together in a stationary position and said collection box rotates in said tank; and wherein said sludge manifold comprises a series of integral spaced connection branches extending orthogonally to said withdrawal pipe and including a central cap closing off an upper end of said withdrawal pipe.

25. A sludge removal apparatus for a clarifier/thickener comprising:

a clarifier/thickener tank having a sludge-receiving tank bottom;

an influent column extending upwardly from said tank bottom and having influent exit ports for discharging influent into said tank;

a sealed collection box submerged in said tank, said collection box surrounding said influent column and being positioned between said tank bottom and said influent exit ports;

means extending from a position adjacent said tank bottom to said collection box for transporting settled sludge adjacent said tank bottom to said collection box;

a sludge withdrawal pipe within said influent column;

means constructed and arranged in flow connection between an interior of said collection box and said withdrawal pipe for removing sludge from said collection box to said withdrawal pipe, and wherein said collection box is positioned substantially adjacent to said tank bottom, a portion of said tank bottom forming a common bottom wall of said collection box.

26. The apparatus of claim 25 further comprising a cylindrical extension movably connected to said collection box such that the vertical height of an annular orifice between said collection box and said tank bottom is adjustable.

27. A sludge removal apparatus for a clarifier/thickener comprising:

a clarifier/thickener tank having a sludge-receiving tank bottom;

an influent column extending upwardly from said tank bottom and having influent exit ports for discharging influent into said tank;

a sealed collection box submerged in said tank, said collection box surrounding said influent column and being positioned between said tank bottom and said influent exit ports;

means extending from a position adjacent said tank bottom to said collection box for transporting settled sludge adjacent said tank bottom to said collection box;

sludge withdrawal pipe within said influent column;

means constructed and arranged in flow connection between an interior of said collection box and said withdrawal pipe for removing sludge from said collection box to said withdrawal pipe, and wherein said means for removing sludge comprises a sludge manifold in said influent column including a spool piece having upper and lower load-carrying flanges connected in line with said influent column and wherein said collection box surrounds said spool piece and said sludge manifold, said sludge manifold extending between said spool upper and lower flanges.

* * * * *